United States Patent
Kalbag

(10) Patent No.: US 8,130,919 B2
(45) Date of Patent: Mar. 6, 2012

(54) MESSAGE DELIVERY USING A VOICE MAIL SYSTEM

(75) Inventor: Rohit Satish Kalbag, Acton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 327 days.

(21) Appl. No.: 12/347,679

(22) Filed: Dec. 31, 2008

(65) Prior Publication Data

US 2009/0110159 A1    Apr. 30, 2009

Related U.S. Application Data

(63) Continuation of application No. 10/685,359, filed on Oct. 14, 2003, now Pat. No. 7,561,679.

(51) Int. Cl.
*H04M 1/64* (2006.01)
(52) U.S. Cl. .............. 379/88.22; 379/88.14; 379/114.13
(58) Field of Classification Search ............... 379/88.12, 379/88.22–88.25, 88.13, 88.14, 114.13
See application file for complete search history.

(56) References Cited

U.S. PATENT DOCUMENTS

| | | | | |
|---|---|---|---|---|
| 5,838,790 A * | 11/1998 | McAuliffe et al. | ........... | 713/176 |
| 5,848,397 A * | 12/1998 | Marsh et al. | ................ | 705/14.61 |
| 5,937,037 A * | 8/1999 | Kamel et al. | ................ | 379/88.19 |
| 6,137,864 A * | 10/2000 | Yaker | ......................... | 379/88.22 |
| 6,304,636 B1 * | 10/2001 | Goldberg et al. | .......... | 379/88.14 |
| 6,389,276 B1 * | 5/2002 | Brilla et al. | .................... | 455/413 |
| 6,603,838 B1 * | 8/2003 | Brown et al. | ............... | 379/88.22 |
| 6,665,378 B1 * | 12/2003 | Spielman et al. | .......... | 379/88.12 |
| 6,681,114 B2 * | 1/2004 | Chang et al. | ................ | 455/456.3 |
| 6,865,260 B1 * | 3/2005 | Meadows et al. | .......... | 379/88.22 |
| 6,950,502 B1 * | 9/2005 | Jenkins | ...................... | 379/88.12 |
| 7,136,462 B2 * | 11/2006 | Pelaez et al. | ............... | 379/88.14 |

* cited by examiner

*Primary Examiner* — Simon Sing

(57) ABSTRACT

Voicemail systems and methods can provide a user with means for receiving categorized messages from parties. The categories can be independent of the intended recipients of the messages, such that multiple users can receive the same message. A user can subscribe to receive categorized messages within selected categories or from selected parties. A registered party, including a merchant, an organization, a government agency and/or another party, can input messages to selected categories and can input distribution parameters for the messages. Expiration dates can be associated with the messages such that messages can be deleted once expired.

24 Claims, 3 Drawing Sheets

MESSAGE DELIVERY USING A VOICE MAIL SYSTEM

CROSS REFERENCE TO RELATED APPLICATIONS

This application is a continuation of U.S. patent application Ser. No. 10/685,359, filed on Oct. 14, 2003, which is hereby incorporated by reference in its entirety.

FIELD

The systems and methods relate to message systems, and more particularly to voice mail systems through which the user can subscribe to selected announcements.

BACKGROUND

Voice Mail Systems (VMS's) can allow a user to retrieve messages left by callers. Generally, a caller places a call to the user and the VMS can give the caller the option of leaving a message for the user when the user does not answer the call. However, the user has little control over the message content or over who is leaving a message. More recent VMS's provide the caller's identification to the user prior to presenting the message to the user. Thus, such systems can provide an opportunity for the user to screen messages prior to listening to the messages.

Email systems offer another means by which a message can be left for a user. Current email systems can provide means for a user to categorize incoming messages, such that the user can choose categories of email to view. For example, a filter can be applied to incoming email to detect junk mail and the system can place junk mail in a folder separate from other email, or can delete it entirely if the user so chooses. In addition, users can subscribe to receive emails from selected parties. For example, a user may choose to receive emails for updates to software he has purchased and to receive emails from merchants regarding promotional sales of certain products. A need exists for a voice mail system that can include the organizational and subscription capabilities of email systems, as well as other improved services for the user. A further need exists for a messaging system wherein a party sending a message can categorize the contents of the message and users can choose the categories of messages they wish to retrieve.

SUMMARY

Message systems and methods can provide a user with means for receiving categorized messages from parties. The categories can be independent of or unrelated to the intended recipients of the messages, such that multiple users can receive the same message. A user can subscribe to receive categorized messages within selected categories or from selected parties. A registered party, including a merchant, an organization, a government agency and/or another party, can input messages to selected categories and can input distribution parameters for the messages. Expiration dates can be associated with the messages such that messages can be deleted once expired.

In one embodiment, a method of message delivery using a message system can include receiving a message from a party and a category designation for the message from the party, storing the message in a storage area of the voice mail system corresponding to the category designation for the message, retrieving messages from the storage area based on a user of the message system choosing the category designation from among a listing of the category designations, and presenting the messages to the user. The user can choose from among a listing of category designations. The category designations can be separate from designation of the intended recipients of the message. The message can be presented to the user in the form of an audio message, a text message, and/or a visual message and can include a text-to-speech and/or a speech-to-text conversion. The user can choose to subscribe to future messages from the party when the message is presented to the user, and the future messages received at the message system from the party can be tagged or otherwise identified as subscribed to messages for the user. The method can provide notifications to the user when the future messages are received.

The method can also include placing a call from the user to the party based on the user choosing an option to place a call when the message is presented to the user. The method can include matching distribution parameters received for the message with user profile data. Messages can be received with expiration parameters for the message, such that the message can be deleted when the expiration parameter is exceeded. The method can include incrementing a counter to track a number of times the message is retrieved.

The message system can include a voice mail system. In one aspect, the method can include providing a first choice for the message system to place a call from the user to the party, providing a second choice for the user to subscribe to future messages from the party when the message is presented to said user, and identifying the future messages received at the message system from the party as subscribed to messages for the user, when the user chooses the second choice. Receiving a message can include receiving distribution parameters and expiration parameters for the message, wherein the distribution parameters can be matched with user profile data and the messages can be deleted from the storage areas when the expiration parameter is exceeded. Retrieving a message can include incrementing a counter to track a number of times the message is retrieved.

In one embodiment, a method of receiving messages can include accessing a message system having a plurality of messages stored in categorized storage areas, wherein categories of the categorized storage areas are independent of intended recipients of the messages, choosing at least one of the categories to obtain at least one chosen category, retrieving messages from the at least one chosen category, and incrementing counters for the messages when the messages are retrieved, each of the counters associated with one of the messages input to the message system by a party, each of the counters accessible by the party for determining a number of times the one of the messages is retrieved.

The method can include optionally placing a call to the party when a user of the message system retrieves one of the messages input by the party, optionally subscribing to receive future messages from the party when a user of the message system retrieves one of the messages input by the party, identifying the future messages input by the party as subscribed to messages for the user; and searching each of the categories to retrieve the subscribed to messages for the user when the user chooses a subscribed to category. In one aspect, the method can include optionally subscribing to receive future messages from the party when a user of the message system retrieves one of the messages input by the party, identifying the future messages input by the party as subscribed to messages for the user, forwarding the subscribed to messages to a personal message storage area for the user, and retrieving the subscribed to messages from the personal message storage area when the user chooses a subscribed to category.

In one aspect, the message system can include a voice mail system and retrieving can include optionally placing a call from the user to the party when a user of the message system retrieves one of the messages input by the party and optionally subscribing to receive future messages from the party when a user of the message system retrieves one of the messages input by the party. The method can include searching each of the categories to retrieve said future messages when the user chooses a subscribed to category, or can include forwarding the future messages to a personal message storage area for the user for retrieval from the personal message storage area when the user chooses a subscribed to category.

In one embodiment a message system for providing message delivery can include an input controller to receive and categorize messages from a subscriber to obtain categorized messages, a plurality of categorized storage areas for storing respectively categorized messages, and an access controller to receive, from a user of the message system, a selection of at least one category to obtain a selected categorized storage area, to retrieve the respectively categorized messages from the selected categorized storage area, and to present the respectively categorized messages to the user. The system can include a voice mail system and at least one of an interactive voice response module and a dual tone multi frequency module for the input controller and the access controller. In addition, the system can include a user database and a subscriber database for storing profiles of the users and subscribers of the message system, respectively.

In one embodiment, a computer-readable medium can contain instructions for controlling a computer system to deliver messages by receiving a message from a party and a category designation for the message from the party, storing the message in a storage area corresponding to the category designation for the message, retrieving messages from the storage area based on a user choosing the category designation, and presenting the messages to the user. The instructions can control the computer system to present a listing of category designations for selection by the user. The category designation can be separate from designation of the intended recipients of the messages. The instructions can control the computer system to provide a choice for the user to subscribe to future messages from the party when presenting the messages to the user, tag or otherwise identify the future messages received from the party as subscribed to messages for the user, and provide notifications to the user when the future messages are received. The instruction can control the computer to place a call from the user to the party based on the user choosing an option to place a call when presenting the messages to the user.

The instructions can control the computer system to receive distribution parameters for the message and match the distribution parameters with user profile data when retrieving messages. The instructions can control the computer system to receive an expiration parameter for the message and delete the message from the storage area when the expiration parameter is exceeded. A counter can be incremented for tracking a number of times the message is retrieved.

In one aspect, the instructions can control a computer system to deliver voice mail messages, to receive distribution parameters for the messages, and to match the distribution parameters with user profile data when retrieving messages. The instructions can include controlling a computer system to receive expiration parameters for the messages and delete the messages from the storage areas when the expiration parameters are exceeded. Additionally, the instructions can control the computer system to increment a counter for tracking a number of times a message is retrieved.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Figure 1:
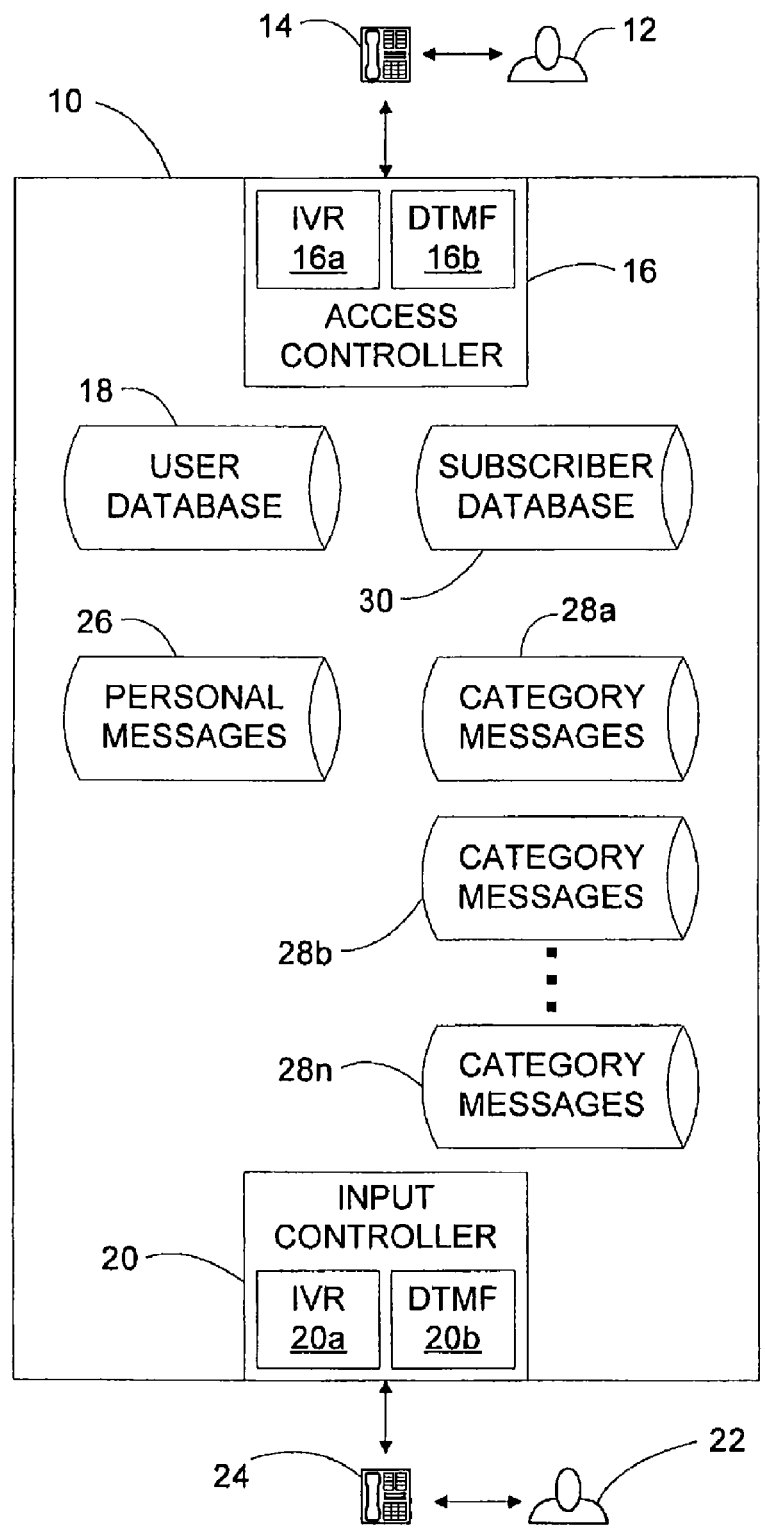
FIG. 1 illustrates a block diagram of a message system having categorized messages.

Referring to FIG. 1, there is shown a message system 10. For the exemplary embodiment of FIG. 1, system 10 can include a Voice Mail System (VMS) 10 that can provide enhanced features for a user 12 of VMS 10. User 12 can connect to VMS 10 through a communication device 14, such as the illustrated land line phone, or a wireless phone, personal computer, Personal Digital Assistant (PDA) or other known communication device. Device 14 can connect to VMS 10 in the manner of known communication devices and voice mail systems, e.g., over a Public Switched Telephone Network (PSTN), wireless network, Internet and/or other communications network.

VMS 10 can include access controller 16 for facilitating user access to VMS 10. In one embodiment, user 12 can access VMS 10 by calling an access number from device 14 and inputting one or more codes and/or passwords to access controller 16. User 12 can interact with access controller 16 through one or both of an Interactive Voice Response (IVR) module 16a or a dual tone multi frequency (DTMF) module 16b, as are known in the art. Controller 16 can compare user 12 inputs with a user database 18 of VMS 10 to verify that user 12 has authority to access messages in VMS 10.

VMS 10 can include an input controller 20 that can accept a message for user 12 from calling party 22 for storage in VMS 10. Interactions of party 22 with input controller 20 via device 24 can be mediated by IVR module 20a and/or DTMF module 20b. Device 24 can include known communications devices, such as the illustrated land line phone, a wireless phone, personal computer, or other known communication device. Device 24 can connect to VMS 10 in the manner of known communication devices and voice mail systems, e.g., over a Public Switched Telephone Network (PSTN), wireless network, Internet and/or other communications network. It can be understood that access controller 16 and input controller 20 can provide for user 12 and party 22 interactions with VMS 10 in addition to IVR and DTMF interactions, including Graphical User Interfaces (GUI's) and/or other interfaces compatible with devices 14 and 24 and their connections to VMS 10.

For personal message input and retrieval, VMS 10 can operate in the manner of known voice mail systems. For example, when user 12 does not answer a call from party 22, party 22 can be directed to VMS 10 and input controller 20 can prompt the party 22 to record a message for user 12. VMS 10 can store the message in personal message storage area 26 for retrieval by user 12. Personal message storage area 26 can include a database for storing messages and related message information, e.g., time, date, calling party, etc. In addition to the known voice mail operation described above, VMS 10 can provide enhanced features by which a user can subscribe to receive voice messages within selected categories and/or from selected parties.

Figure 2:
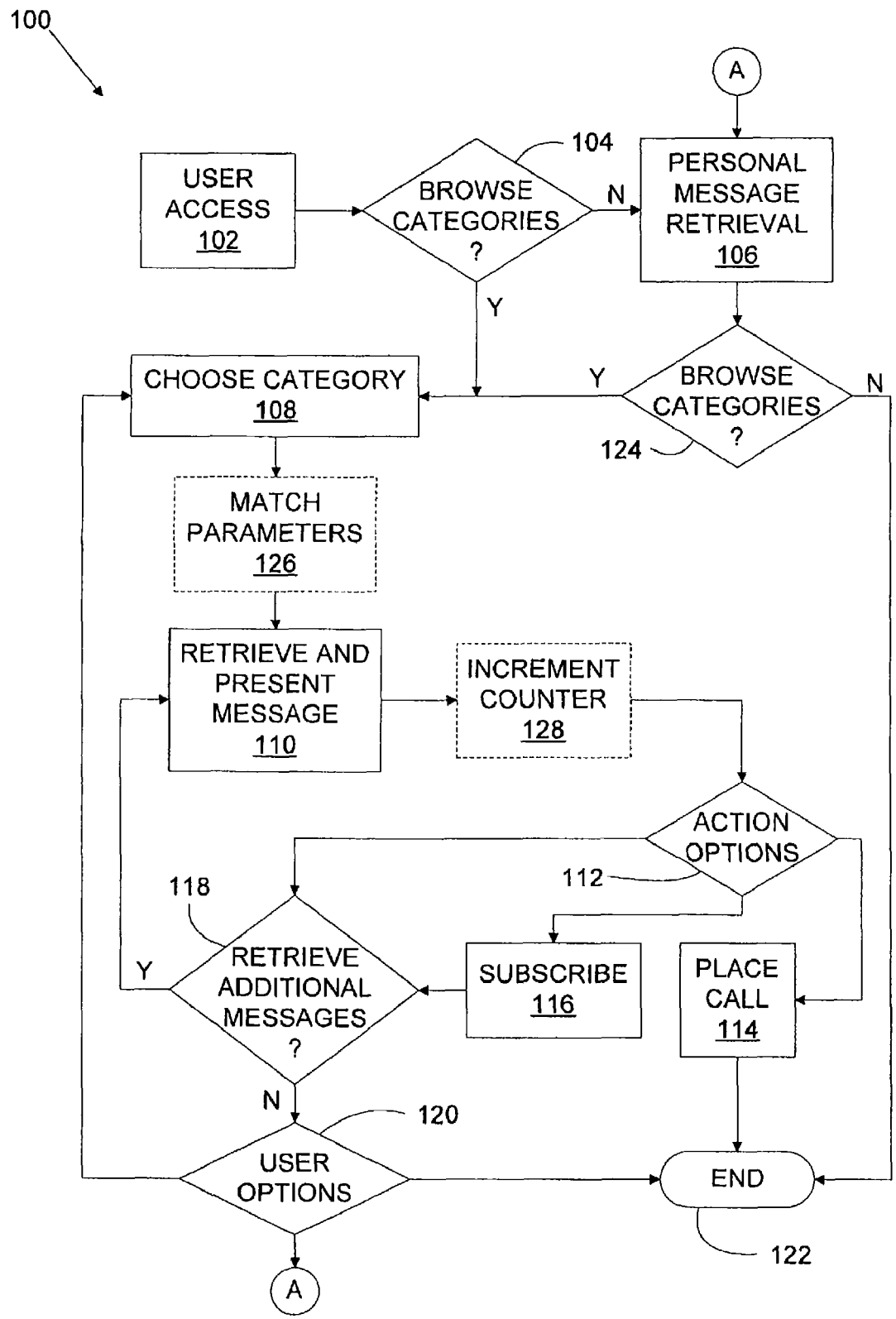
FIG. 2 illustrates a flow chart of a method of implementing access to messages in the system of FIG. 1.

Referring to FIG. 2, there is illustrated a flow chart for a method 100, which can implement the enhanced features for VMS 10 for user 12. Method 100 can start when user 12 accesses VMS 10, as previously described and as indicated at 102. Access controller 16 can provide the user 12 with an option (104) to browse message categories or retrieve personal messages. Personal message retrieval, as at 106, can be implemented by method 100 in the manner of known methods for retrieval of messages from voice mail systems, such as retrieval of messages from personal message storage area 26 of VMS 10.

If user 12 chooses to browse message categories, access controller 16 can provide a listing of categories from which user 12 can choose a category to browse, as at 108. The categories can be related to the contents of the message, though those of skill in the art can contemplate other category relationships, including social and business relationships. It can be understood that the categories can include multiple levels of subcategories and that choosing the category can include choosing from among subcategories. For example, the categories can include a "town" category, the "town" category can include subcategories including a "school" subcategory and the "school" subcategory can include subcategories for specific schools and/or administrative departments. As is known in the art, user 12 can navigate through a series of hierarchal menus or listings to obtain the desired category and/or subcategory.

VMS 10 can include one or more category message storage areas 28*a-n*, and messages within the chosen category can be retrieved (110) from the corresponding category message storage area for presentation to user 12. Category message storage areas 28*a-n* can include one or more databases for storing messages and related message information, e.g., time, date, calling party, etc. Message retrieval from category message storage areas 28*a-n* can be implemented by method 100 in the manner of known methods for retrieval of messages from voice mail systems, including saving, skipping and/or deleting messages. It can be understood that presentation of messages can include audio, text and/or visual display, including speech-to-text or text-to-speech conversion. As an example, access controller 16 and input controller 20 can include such conversion capabilities.

When a message from category message storage areas 28*a-n* is saved by user 12, a copy of the message can be stored in the personal message storage area for user 12. When a message from category message storage areas 28*a-n* is deleted by user 12, the message can remain in the category message storage areas 28*a-n* for retrieval by other users, but retrieval by user 12 can be restricted. Thus, it can be understood that while messages can be available for multiple users, the effects of actions taken by one user 12 with respect to messages in category message storage areas 28*a-n* can be limited to that one user 12.

In one embodiment, illustrated in FIG. 2, user 12 can have options (112) to take a number of actions with relation to the retrieved message. User 12 can choose to place a call to the party 22 that recorded the message being retrieved by user 12, as indicated at 114. When the option to place a call is chosen, VMS 10 can connect with a phone number associated with the message, as is known in the art for voice mail systems.

In addition, the options at 112 can include an option to subscribe to messages from party 22, as indicated at 116. Future messages from party 22 can then be directed to personal message storage area 26 for user 12. Alternatively, the future messages can be directed to one of the category message storage areas designated for messages subscribed to by user 12, e.g., category message storage area 28*b* can be so designated. It can be understood that subscribed to messages can be categorized in the manner of other categorized messages. For example, continuing with the exemplary hierarchal scheme described above, the "subscribed to" category can include a "town" subcategory that can include a "school" subcategory, etc. In one embodiment, a user profile in user database 18 can include subscriber data indicating those parties 22 to which user 12 has subscribed. For retrieval of "subscribed to" messages when user 12 chooses the "subscribed to" category at 108, VMS 10 can search through the category message storage areas 28*a-n* and retrieve messages from parties 22 matching the subscriber data in the user profile.

Method 100 can continue to retrieve messages from the chosen category, as at 110, until no unretrieved messages remain in the category, or until user 12 chooses not to retrieve additional messages from the category, as determined at 118. If no additional messages are to be retrieved, method 100 can provide user 12 with options (120) including choosing another category by returning to 108, retrieving personal messages by returning to 106, as indicated at "A", or ending access to VMS 10, as at 122. It can be understood that placing a call, as at 114, can also end access to VMS 10. It can also be understood that after retrieving personal messages, as at 106, user 12 can have the option (124) to browse categories, as at 108, or to end access to VMS 10, as at 122.

It can be understood that accessing VMS 10 at 102 can include user 12 registering with system 10. During registration, user 12 can input preferences for the operation of VMS 10. Such preferences can include the designation of the storage area for messages subscribed to, designation of categories for which user 12 can receive messages for browsing, designation of categories and/or parties user 12 does not want to receive messages from and other preferences and/or choices user 12 may implement to help customize the operation of VMS 10 for user 12. The preferences can also include an expiration time period for categorized messages, such that categorized messages stored longer than the expiration time period will not be included in the messages to be retrieved by user 12. VMS 10 can include default values for preferences that user 12 does not specifically designate. For example, unless otherwise specified by user 12, VMS 10 can delete messages after a period of 30 days. The preferences can be included with other user 12 registration information in user database 18, for example in the user 12 profile. It can be understood that the user can modify such preferences when accessing VMS 10 at 102.

Figure 3:
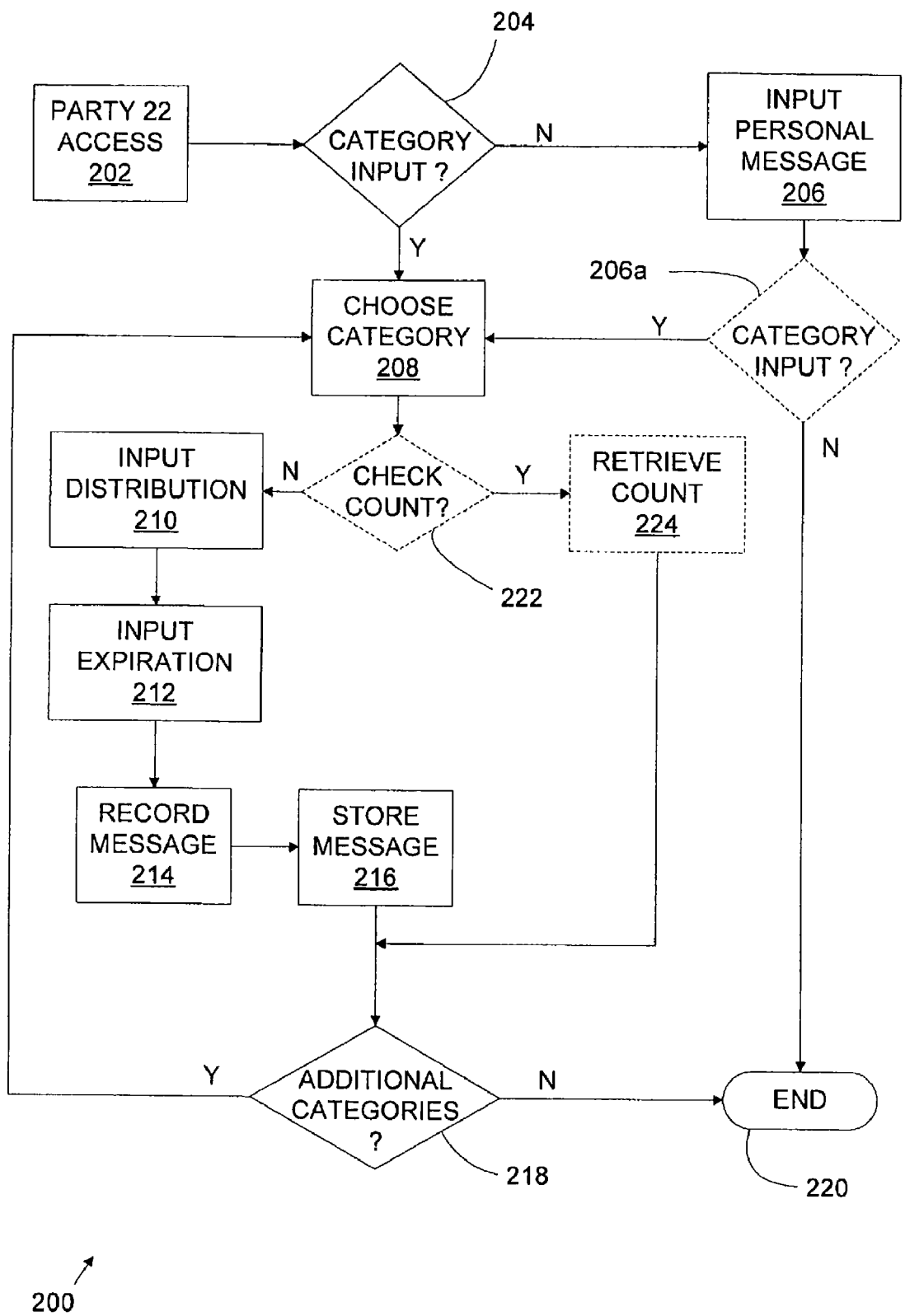
FIG. 3 illustrates a flow chart of a method of implementing inputting messages to the system of FIG. 1.

FIG. 3 illustrates a flow chart for a method 200 that can implement the input of messages to VMS 10 by party 22. Method 200 can start when party 22 accesses VMS 10, as at 202. Controller 20 can determine (204) whether party 22 can input a personal or category type message, depending on how party 22 accessed VMS 10. Since VMS 10 can function in the manner of known voicemail systems, party 22 can be directed to VMS 10 when user 12 does not answer a call from party 22, as previously described, and method 200 can implement inputting a personal message (206) in the manner of known voice mail systems. For example, controller 20 can prompt party 22 to leave a message for user 12, which can be stored in personal message storage area 26.

It can be understood that access by party 22 can include dialing a predetermined access number and inputting one or more passwords and/or codes, in a manner similar to user 12 access to VMS 10, as previously described. Input controller 20 can compare subscriber 22 inputs with a subscriber database 30 of VMS 10 to verify that user 22 has authority to input messages to VMS 10. During registration with VMS 10, party 22 can provide subscriber information that VMS 10 can store in subscriber database 30 of VMS 10, for example as a subscriber profile. It can be understood that party 22 can modify the subscriber information when accessing VMS 10 at 202.

When party 22 accesses VMS 10 in such a manner, i.e., other than by being directed to VMS 10 when user 12 did not answer a call, party 22 can choose one or more categories that the message can be directed to, as at 208. It can be understood that the categories available to party 22 can be consistent with those identified in the profile for party 22 in subscriber database 30.

Optionally, party 22 can indicate distribution and expiration parameters for the message to be input, as indicated at 210 and 212, respectively. For example, a merchant can be included in multiple categories consistent with each type of merchandise sold by the merchant. The merchant may choose to input messages to only those categories corresponding to merchandise that will be on sale. The sale may be at a particular one of the merchant's locations for a certain period of time. The merchant can input distribution parameters corresponding to an area near that location and can set the expiration of the message to correspond with the end of the sale period, so that the message can be deleted from the category when the sale is over. When the expiration period set by user 12 is shorter than that provided by party 22, the message can be flagged after the user 12 set expiration period such that it can be retrieved by other users, but will not be included in the messages to be retrieved by user 12.

The distribution parameters can be designated by phone exchange, zip code, or other distribution parameters or combinations of distribution parameters that VMS 10 can match with data in the user profiles in user database 18, as indicated in phantom at 126 in FIG. 2. For example, the message can be distributed to users having a designated area code (XXX), exchange (XXX)-YYY, or zip code ZZZZZ. It can be understood that ranges and/or combinations of distribution designators can be input, e.g., ZZZ* can designate all zip codes beginning with ZZZ, and ZZZ21-ZZZ74 can designate the range of zip codes from ZZZ21 to ZZZ74. It can also be understood that the distribution need not be so limited and that the message can be designated to be retrievable by all users choosing to retrieve messages from the designated category. Thus, it can be understood that category messages can be stored in category messages storage areas 28a-n related to the category of the messages and that the category messages storage areas 28a-n can be unrelated to, or independent of, the intended recipients of the messages, e.g., the particular users, or groups of users that can receive the messages by accessing the category.

When prompted, party 22 can record the message, as at 214 and the message can be stored (216) in the appropriate category message storage areas 28a-n of FIG. 1 for the designated categories, with associated identifiers for distribution and/or expiration. As determined at 218, party 22 can input additional messages by returning to 208, or can end inputting messages, as at 220. It can be recognized that access to VMS 10 can also end (220) after party 22 inputs a personal message, as at 106. In one embodiment, the profile for party 22 in subscriber database 30 can include "subscribed to" data indicating those users 12 subscribing to messages from party 22. When party 22 inputs a message, the distribution can include sending the message to the personal messages storage area 26 and/or the subscriber category message storage area for the users 12 indicated by the "subscribed to" data.

It can be understood by those of skill in the art, that the distribution of messages can be realized by linking or otherwise relating the user database 18, the subscriber database 30 and the category message storage areas 28a-n of FIG. 1. For example, a message can include a zip-code tag or identification such that only users with a zip code matching the tag can retrieve the message. Similarly, VMS 10 can track received messages, e.g., in the user database 18, or by attaching a user identifier tag to the message, such that the user 12 need only retrieve a message once. In this manner, storage requirements for the personal and category message storage areas of VMS 10 can be optimized.

Optionally, retrieval of a message by user 12, as indicated at 110 of FIG. 2, can cause access controller 16 to increment a counter for the message, as indicated in phantom at 128 of FIG. 2. The count can be associated and stored with the related message in storage areas 28a-n. In the case where user 12 deletes or skips a retrieved message for a category, the message can remain in category storage areas 28a-n, as previously noted, and be marked and/or tagged as retrieved by the user without incrementing the count. It can be understood that Party 22 can be provided an option, indicated in phantom at 222 of FIG. 3, to check the count by retrieving the count for the message, as indicated in phantom at 224 of FIG. 3. The count can provide party 22 with an indication as to the number of users that have retrieved the message. Once the counts are retrieved, party 22, via 218, can return to choose more categories at 208, or can end access to VMS 10, at 220.

VMS 10 and the methods described herein can provide user 12 with the ability to browse and subscribe to categories of messages that can have content other than personal messages for user 12. For example, the content can include promotional announcements by local merchants, announcements by local authorities (town offices, police), newsletters, new product announcements, product update notices and other types of content. An example interaction of a user 12 with VMS 10 is described below. In the example, user 12 entries are enclosed in brackets [ ], VMS 10 prompts are italicized and message content is underlined.

*Press 8 or say Content to browse content categories* [8]
   *Enter the category number or say the category name if known or Press #* [#]
      *Press 0 or say Town to listen to messages in the Town category*
      *Press 1 or say News to listen to messages in the Local News category*
      *Press 2 or say Discounts to listen to messages in the Discounts category* [2]
         *Press 0 or say Restaurants to listen to messages in the Restaurant Discounts category* [0]
            First message from Tony's Pizza <u>Order 1 large pizza, get the second half price. Use voicemail coupon code "DISC001" when ordering. Offer valid till February 28th</u>

Press 0 to Save, 1 to Skip, 2 to call Tony's Pizza, 3 to subscribe to messages from Tony's Pizza [3]
Second message from Mex Roadhouse [1]
No more messages in the Restaurant Discounts category. Press 1 for more categories or # to end [#]

In the above example, user 12 pressed '3' to subscribe to messages from Tony's Pizza. Future messages from Tony's Pizza can be placed in the message storage area designated in the user 12 profile in user database 18. The categories presented to the user 12 can include a "subscribed to" category. For example, the prompts provided by VMS 10 can include a prompt such as: Press 8 or say Subscriptions to listen to messages in the Subscribed To category.

Depending on the preferences chosen by user 12, the Subscribed To category can include subcategories, such as the Discounts and Restaurants categories above that the user 12 can be prompted to choose. In one example, the Subscribed To category can simply include the messages by party, such as Tony's Pizza, wherein the user 12 can be prompted to choose the party, or wherein the messages are simply presented to the user 12 when the Subscribed To category is chosen. Other user preferences can include having or not having a "new voicemail" dial tone indicator activated for subscribed to messages.

Billing for the services offered by VMS 10 can be implemented in a variety of ways. In one embodiment, billing can include monthly fees charged to users 12, e.g., as an additional fee added to a user's personal voice mail system fee. Alternatively or additionally, parties 22 can be charged a monthly fee for access to VMS 10, or can be charged a fee based on the number of messages input, or based on the count of messages retrieved. It can be understood that other billing schemes can be employed, including combinations of the above.

The systems and implementations thereof described herein may not be limited to particular components or configurations. For example, VMS 10 can include a single controller that can include access controller 16 and input controller 20. The single controller can determine whether to operate in the access or input mode based on the access number and/or code used to connect to VMS 10. Also, one or more of user database 18, subscriber database 30 and message storage areas 26 and 28a-n can reside in computer memory that can be separate from VMS 10. One or more of the databases and/or message storage areas can be combined, or can be configured for multiple users 12. In addition, the systems and methods described herein can be readily adapted for use with other message systems including email messaging and/or paging systems.

VMS 10 can include processors, e.g., controllers 16, 20, volatile memory and non-volatile memory for storing messages, user data, subscriber data and other data corresponding to input and output values and other intermediate computations for the methods 100 and 200. The memory can include instructions for executing the methods 100 and 200, which can be transferred, in the course of operation, from the non-volatile memory to the volatile memory and to the processor for execution.

Additionally, the flow charts in FIGS. 2 and 3 can illustrate an exemplary implementation of the enhanced features of VMS 10 and other configurations can be contemplated and/or other actions, decisions, menus and the like can be included. For example, after inputting a personal message at 206 of FIG. 3, method 200 can include an option 206a, shown in phantom in FIG. 3, for party 22 to input category messages. In another example, the categories presented to user 12 at 108 of FIG. 2 can include a "personal" category. For user 12 in this example, the browse option at 104 of FIG. 2 can be incorporated into the category selection of 108 of FIG. 2.

The systems and methods described herein may not be limited to a particular hardware or software configuration; they may find applicability in many computing or processing environments. They can be implemented in hardware or software, or a combination thereof. Preferably, the methods 100 and 200 can be implemented in computer programs running in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, configured with a computer program, where the storage medium so configured can cause a computer to operate in a specific and predefined manner.

References to "microprocessor" and/or "processor" can be understood to include one or more microprocessors that can communicate in a stand-alone and/or a distributed environment(s), and can thus can be configured to communicate via wired or wireless communications with other processors, where such processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A voice mail system comprising:
   at least one subscriber database;
   at least one voice mail message in the at least one subscriber database associated with at least one category;
   at least one user database, wherein the at least one user database is configured to store the message retrieved from the at least one subscriber database;
   an access controller configured to present an indication that the message is available in the at least one subscriber database, wherein the indication is presented based on predefined preferences for allowing indications related to messages in the subscriber database;
   wherein the access controller is further configured to receive a request to retrieve the message from the at least one subscriber database; and
   wherein the access controller is further configured to deliver the message, formatted for visual display.

2. The voice mail system of claim 1, wherein the request to retrieve the message is received through at least a partially wireless mechanism.

3. The voice mail system of claim 1, wherein the message includes distribution parameters, and wherein the distribution parameters include at least one of phone exchange and zip code.

4. The voice mail system of claim 1, wherein the message includes distribution parameters, and wherein the distribution parameters include ranges of at least one of one of phone exchange and zip code.

5. The voice mail system of claim 1, wherein the message includes expiration parameters.

6. The voice mail system of claim 1, wherein the at least one user database is configured with designations of message storage categories and wherein the designations of message storage categories include at least one excluded category such that a categorized voice mail message including the excluded category is not retrieved from the at least one subscriber database.

7. The voice mail system of claim 1, wherein the predefined preferences include a message expiration time such that an indication of an expired message is not presented.

8. The voice mail system of claim 1, wherein the access controller is configured to receive a selection of deleting the message in the at least one user database, and wherein deleting the message from the at least one user database removes user access to the message without limiting the providing of the message to an alternative user database.

9. The voice mail system of claim 1, wherein the preferences include a subscription to receive messages from at least one of selected categories and selected message providers.

10. The voice mail system of claim 1, wherein the at least one subscriber database includes categories and subcategories.

11. The voice mail system of claim 1, wherein the message is an announcement from a government authority.

12. The voice mail system of claim 1, wherein the preferences include a selection of a dial tone indicator indicating receipt of a new message.

13. The voice mail system of claim 1, wherein the access controller attaches an identifier tag to a retrieved message, indicating that the message was retrieved.

14. The voice mail system of claim 1, wherein an input controller is configured to verify the authority of a message provider to input messages to a subscriber database.

15. The voice mail system of claim 14, further comprising at least one of an interactive voice response module and a dual tone multi frequency module in communication with at least one of the access controller and the input controller.

16. The voice mail system of claim 14, wherein one of the access controller and the input controller is configured to provide a count of the number of times that the message has been retrieved.

17. The voice mail system of claim 14, wherein the access controller and the input controller are one controller, and the controller determines whether to operate in access mode or input mode based on a code used to connect to the voice mail system.

18. A method for selection of preferences in a voice mail system comprising:
   providing to a user an at least partially wireless access to the voice mail system;
   receiving from the user a designation of at least one subscriber category of at least one database in the voice mail system from which to receive messages;
   receiving from the user a designation of expiration time periods for categorized messages indicating that expired messages should not be presented;
   receiving from the user a designation of storage areas for received messages; and
   receiving from the user a selection of whether to indicate the availability of a new voice mail message.

19. The method of claim 18, further comprising receiving a designation of at least one subscriber category from which not to receive messages.

20. The method of claim 18, further comprising receiving a designation of message providers from which to receive messages.

21. A method for providing voice mail to a plurality of users, comprising:
   providing voice mail system access to at least one user, configuring at least one subscriber database with at least one category;
   registering a plurality of users, wherein registering a user includes receiving a user profile with user preferences associated with each user, the preferences including at least one of a designation of database categories from which to receive messages and a designation of database categories from which to not receive messages;
   storing at least one message in at least one category in a subscriber database;
   indicating to a user accessing the voice mail system that a voice mail message is available in the subscriber database, wherein the indication is provided according to the user preferences; and
   formatting the voice mail message for visual display.

22. The method of claim 21, further comprising:
   providing voice mail access to at least one message provider; and
   registering the at least one message provider including receiving of a provider profile with provider preferences associated with the at least one provider.

23. The method of claim 21, further comprising configuring the access for accommodating wired and wireless access.

24. The method of claim 21, further comprising delivering the message upon request;
   providing the option to delete the message; and
   retaining the message for access by other users after deletion by one user.

* * * * *